US011879022B2

(12) United States Patent
Inada et al.

(10) Patent No.: US 11,879,022 B2
(45) Date of Patent: Jan. 23, 2024

(54) METHOD FOR PRODUCING DEPOLYMERIZED CELLULOSE ETHER

(71) Applicant: Shin-Etsu Chemical Co., Ltd., Tokyo (JP)

(72) Inventors: Shinnosuke Inada, Joetsu (JP); Taishi Kitaguchi, Joetsu (JP); Akira Kitamura, Joetsu (JP); Mitsuo Narita, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 3 days.

(21) Appl. No.: 17/505,926

(22) Filed: Oct. 20, 2021

(65) Prior Publication Data

US 2022/0127380 A1     Apr. 28, 2022

(30) Foreign Application Priority Data

Oct. 22, 2020    (JP) ................................ 2020-177485

(51) Int. Cl.
*C08B 11/20*        (2006.01)
(52) U.S. Cl.
CPC .................................... *C08B 11/20* (2013.01)
(58) Field of Classification Search
CPC .................................................... C08B 11/20
See application file for complete search history.

(56) References Cited

U.S. PATENT DOCUMENTS

| | | |
|---|---|---|
| 3,391,135 A | 7/1968 | Shigeru et al. |
| 10,906,992 B2 | 2/2021 | Kitaguchi et al. |
| 2014/0148591 A1 | 5/2014 | Engleman et al. |

FOREIGN PATENT DOCUMENTS

| | | | |
|---|---|---|---|
| EP | 0210917 A2 | 2/1987 | |
| EP | 1130033 A1 * | 9/2001 | ............. C08B 11/20 |
| JP | S6225101 Y2 | 6/1987 | |
| JP | 2009540098 A | 11/2009 | |
| WO | 0032637 A1 | 6/2000 | |
| WO | 0063254 A1 | 10/2000 | |
| WO | 2007145709 A1 | 12/2007 | |

OTHER PUBLICATIONS

Extended European Search Report corresponding to European Patent Application No. 21203962.2 (7 pages) (dated Mar. 21, 2022).
U.S. Appl. No. 17/505,920, Miki et al., filed Oct. 20, 2021.

\* cited by examiner

*Primary Examiner* — Shaojia A Jiang
*Assistant Examiner* — Everett White
(74) *Attorney, Agent, or Firm* — Myers Bigel, P.A.

(57) ABSTRACT

There is provided a method for producing a depolymerized cellulose ether having yellowness reduced. More specifically, there is provided a method for producing a depolymerized cellulose ether comprising a depolymerization step of depolymerizing a cellulose ether with an aqueous solution of acid in the presence of a polyhydric alcohol having 2 to 6 carbon atoms.

13 Claims, No Drawings

METHOD FOR PRODUCING DEPOLYMERIZED CELLULOSE ETHER

BACKGROUND OF THE INVENTION

1. Field of the Invention

The invention relates to a method for producing a depolymerized cellulose ether.

2. Related Art

Generally, a cellulose ether having a low degree of polymerization is obtained by depolymerizing a cellulose ether having a high degree of polymerization. In one of widely used depolymerization methods, a powdery cellulose ether having a high degree of polymerization is subjected to addition of an acid, and then heated.

However, when a cellulose ether having a high degree of polymerization is depolymerized by an acid, it is known that the yellowness of the obtained cellulose ether having a low degree of polymerization increases as the degree of polymerization of the cellulose ether having a high degree of polymerization becomes lower. When a cellulose ether having a low degree of polymerization is used as a transparent pharmaceutical capsule or a film coating agent, a cellulose ether having a low degree of polymerization and high yellowness in appearance is not preferable.

As a method for suppressing yellowness of a cellulose ether having a low degree of polymerization, there has been reported a method for producing a cellulose ether having a low degree of polymerization, the method comprising a step of bringing a cellulose ether into contact with an acid in a diluent containing at least 50% by mass of an organic hydroxyl compound having at least one hydroxy group and at least 2 carbon atoms such as an aliphatic acyclic alcohol (e.g., ethanol, isopropanol, n-propanol, n-butanol, sec-butanol, t-butanol, n-pentanol and isomers thereof) and a cyclic alcohol (e.g. methylcyclohexanol) to obtain a partially depolymerized cellulose ether (JP 2009-540098A which is a Japanese phase publication of WO 2007/145709A).

SUMMARY OF THE INVENTION

However, since a large amount of diluent is used for a cellulose ether having a high degree of polymerization in the method of using a diluent containing at least 50% by mass of the above organic hydroxyl compound, a separation step of separating a cellulose ether having a low degree of polymerization from the diluent and and a drying step are required, which is not preferable in terms of production efficiency and atom efficiency. The above organic hydroxyl compound includes an alcohol compound having at least one hydroxy group and at least two carbon atoms, i.e., all alcohols other than methanol, but a monohydroxy compound is preferred, and ethanol and isopropanol are reported as the most preferred organic hydroxyl compound, and the results of ethanol and isopropanol are compared with the results of hexane, 1,1,1-trichloroethane, methanol and dimethoxyethane (JP 2009-540098A which is a Japanese phase publication of WO 2007/145709A).

In view of the above circumstances, an object of the invention is to provide a method for producing a depolymerized cellulose ether having yellowness reduced.

As a result of extensive studies to achieve the object, the inventors have found that a depolymerized cellulose ether having yellowness reduced can be produced by a depolymerization reaction of a cellulose ether with an aqueous solution of an acid in the presence of a polyhydric alcohol having 2 to 10 carbon atoms; and has completed the invention.

In an aspect of the invention, there is provided a method for producing a depolymerized cellulose ether, the method comprising a depolymerization step of depolymerizing a cellulose ether with an aqueous solution of an acid in the presence of a polyhydric alcohol having 2 to 6 carbon atoms to obtain a cellulose ether.

It should be noted that the depolymerized cellulose ether has a lower degree of polymerization than the cellulose ether before the depolymerization, and also includes a cellulose ether having a low degree of polymerization which is used as a transparent pharmaceutical capsule or a film coating agent.

According to the invention, a depolymerized cellulose ether having low yellowness can be produced.

DETAILED DESCRIPTION OF THE PREFERRED EMBODIMENTS

The depolymerized cellulose ether is obtained by a depolymerization reaction between a cellulose ether and an aqueous solution of acid in the presence of a polyhydric alcohol having 2 to 6 carbon atoms.

Examples of the cellulose ether include a water-soluble cellulose ether such as an alkyl cellulose, a hydroxyalkyl cellulose and a hydroxyalkyl alkyl cellulose.

Examples of the alkyl cellulose include methyl cellulose (hereinafter, also referred to as "MC") having a methoxy group content of preferably from 18.0 to 36.0% by mass; and ethyl cellulose having an ethoxy group content of preferably from 40.0 to 50.0% by mass.

Examples of the hydroxyalkyl cellulose include hydroxypropyl cellulose having a hydroxypropoxy group content of preferably from 2.0 to 70.0% by mass; and hydroxyethyl cellulose having a hydroxyethoxy group content of preferably from 2.0 to 70.0% by mass.

Examples of the hydroxyalkyl alkyl cellulose include hydroxypropyl methyl cellulose (hereinafter, also described as "HPMC") having a hydroxypropoxy group content of preferably from 4.0 to 13.0% by mass and a methoxy group content of preferably from 19.0 to 32.0% by mass; hydroxyethyl methyl cellulose having a hydroxyethoxy group content of preferably from 4.0 to 15.0% by mass and a methoxy group content of preferably 20.0 to 26.0% by mass; and hydroxyethyl ethyl cellulose having a hydroxyethoxy group content of preferably from 8.0 to 20.0% by mass and an ethoxy group content of preferably from 20.0 to 38.0% by mass.

The alkoxy group content and the hydroxyalkoxy group content of an alkyl cellulose, a hydroxyalkyl cellulose and a hydroxyalkyl alkyl cellulose may be determined in accordance with the assay for "Hypromellose" in the Japanese Pharmacopoeia Seventeenth Edition.

The viscosity at 20° C. of the 2% by mass aqueous solution of a cellulose ether to be depolymerized is preferably from 400 to 200,000 mPa·s, more preferably from 400 to 150,000 mPa·s, and still more preferably from 400 to 100,000 mPa·s, from the viewpoint of washability of the cellulose ether to be depolymerized.

When the viscosity at 20° C. of a 2 mass % aqueous solution of a cellulose ether is 600 mPa·s or more, the viscosity may be determined by using a single cylinder type rotational viscometer in accordance with "Viscosity measurement by rotational viscometer" in General Tests of the Japanese Pharmacopoeia Seventeenth Edition. When the viscosity at 20° C. of a 2% by mass aqueous solution of a cellulose ether is less than 600 mPa·s, the viscosity may be determined by using a Ubbelohde-type viscometer in accordance with "Viscosity measurement by capillary tube viscometer" in General Tests of Japanese Pharmacopoeia Seventeenth Edition.

The cellulose ether to be depolymerized may be produced by a known method. For example, the cellulose ether may be produced by a method comprising steps of: bringing a pulp into contact with an alkali metal hydroxide solution to obtain alkali cellulose; reacting the alkali cellulose with an etherifying agent to obtain a crude cellulose ether; washing and drying the crude cellulose ether; and optionally pulverizing the washed and dried cellulose ether.

The alkali metal hydroxide solution is not particularly limited. An alkali metal hydroxide aqueous solution is preferable from the viewpoint of economy. The alkali metal hydroxide aqueous solution is not particularly limited. A sodium hydroxide aqueous solution is preferable from the viewpoint of economy.

The etherifying agent is not particularly limited. Examples of the etherifying agent include an alkyl halide such as methyl chloride and ethyl chloride; and an alkylene oxide such as ethylene oxide and propylene oxide.

The water content of the cellulose ether to be depolymerized is preferably more than 0 and not more than 2.00% by mass, and more preferably from 0.10 to 1.00% by mass, from the viewpoint of preventing aggregation of the cellulose ether to be depolymerized.

The water content is defined as {(total mass of cellulose ether–absolutely dry mass of cellulose ether)/(total mass of cellulose ether)}×100%.

Herein, the term "total mass of cellulose ether" means accurately measured mass of cellulose ether before dried in accordance with "Loss on Drying Test" of the Japanese Pharmacopoeia Seventeenth Edition. The term "absolutely dry mass of cellulose ether" means the mass of cellulose ether dried in accordance with the "Loss on Drying Test" of the Japanese Pharmacopoeia Seventeenth Edition.

By carrying out the depolymerization reaction in the presence of a polyhydric alcohol, a depolymerized cellulose ether having low yellowness can be produced.

Many of the polyhydric alcohols have lower volatility and a higher boiling point in comparison with monohydric alcohols. Therefore, when a polyhydric alcohol is used in the high-temperature-required depolymerization reaction of cellulose ether, there is neither heat loss due to vaporization of alcohol nor loss of a solvent, which is advantageous in terms of production. The number of carbon atoms of the polyhydric alcohol is from 2 to 6, preferably from 2 to 4, from the viewpoint of effectively reducing the viscosity of the cellulose ether by depolymerization. The valence of the polyhydric alcohol is preferably from 2 to 6 (dihydric to hexahydric alcohol), more preferably from 2 to 3 (dihydric to trihydric alcohol), from the viewpoint of obtaining a depolymerized cellulose ether having low yellowness.

Examples of the polyhydric alcohol include an alkylene-containing polyhydric alcohol such as glycerin (trihydric alcohol with carbon atom number of 3), ethylene glycol (dihydric alcohol with carbon atom number of 2), propylene glycol (dihydric alcohol with carbon atom number of 3), 1,3-butylene glycol (dihydric alcohol with carbon atom number of 4), and pentylene glycol (dihydric alcohol with carbon atom number of 5); and an oxyalkylene-containing polyhydric alcohol such as diethylene glycol (dihydric alcohol with carbon atom number of 4), and triethylene glycol (dihydric alcohol with carbon atom number of 6).

The amount of the polyhydric alcohol to be used is preferably from 0.010 to 0.15 mol, more preferably from 0.030 to 0.10 mol, relative to 1 mol of the cellulose ether before the depolymerization from the viewpoint of obtaining a depolymerized cellulose ether having low yellowness.

Here, the mole number of cellulose ether is defined by the following formula:

{mass of cellulose ether (g)–mass of water (g) contained in cellulose ether}/{molecular weight per repeating unit (g/mol) in a cellulose chain of cellulose ether}.

The molecular weight per repeating unit in a cellulose chain of cellulose ether may be calculated by the following equations, respectively, regarding the anhydroglucose unit (AGU, $C_6H_{10}O_5$) as 162.

The molecular weight of repeating unit in a cellulose chain of alkyl cellulose as a cellulose ether is defined as follows:

[162/{100–($M_2/M_1$)×alkoxy group content(mass %)}]×100, wherein $M_1$ means a molecular weight of alkoxy group and $M_2$ means a molecular weight increment due to substitution with an alkoxy group.

For example, since $M_1$=31($OCH_3$) and $M_2$=14($CH_2$) in case of MC, the molecular weight per repeating unit of MC is defined as follows:

[162/{100–(14/31)×methoxy group content(mass %)}]×100.

The molecular weight per repeating unit in a cellulose chain of hydroxyalkyl cellulose as a cellulose ether is defined as follows:

[162/{100–($M_2/M_1$)×hydroxyalkoxy group content (mass %)}]×100, wherein $M_1$ means a molecular weight of hydroxyalkoxy group and $M_2$ means a molecular weight increment due to substitution with a hydroxyalkoxy group.

The molecular weight per repeating unit in a cellulose chain of hydroxyalkyl cellulose having a high degree of polymerization as a cellulose ether is defined as follows:

[162/{100–($M_2/M_1$)×hydroxyalkoxy group content (mass %)–($M_4/M_3$)×alkoxy group content(mass %)}]×100, wherein $M_1$ means a molecular weight of hydroxyalkoxy group, $M_2$ means a molecular weight increment due to substitution with a hydroxyalkoxy group, $M_3$ means a molecular weight of alkoxy group, and $M_4$ means a molecular weight increment due to substitution with an alkoxy group.

For example, since $M_1$=75($OCH_2CH_2CH_2OH$), $M_2$=58 ($C_3H_6O$), $M_3$=31($OCH_3$) and $M_4$=14($CH_2$) in HPMC, the molecular weight per repeating unit of HPMC is defined as follows:

[162/{100–(58/75)×the content of the hydroxypropoxy group(mass %)–(14/31)×the content of the methoxy group(mass %)}]×100.

Examples of the acid aqueous solution to be used for the depolymerization include a hydrogen halide aqueous solution such as a hydrogen chloride aqueous solution, a hydrogen bromide aqueous solution and a hydrogen iodide aqueous solution. The hydrogen chloride aqueous solution (hereinafter, also described as "hydrochloric acid") is preferable from the viewpoint of easy acid removal after the depolymerization.

An amount of the acid aqueous solution to be used is calculated based on the concentration of the acid in the acid aqueous solution and the amount of the acid to be used.

The concentration of the acid in the acid aqueous solution is preferably more than 0% by mass and not more than 35% by mass, and more preferably from 8 to 15% by mass, from the viewpoint of controlling the viscosity of the depolymerized cellulose ether.

The amount of the acid to be used is preferably from 0.005 to 0.200 mol, more preferably from 0.007 to 0.100 mol, relative to 1 mol of the pre-depolymerization cellulose ether from the viewpoint of controlling the viscosity of the depolymerized cellulose ether.

In order to obtain a mixture of the polyhydric alcohol having 2 to 6 carbon atoms, the acid aqueous solution and the cellulose ether to be depolymerized, the polyhydric alcohol having 2 to 6 carbon atoms and the aqueous solution of an acid are added preferably in this order, in reverse order, simultaneously, or as a mixture thereof to the cellulose ether to be depolymerized from the viewpoint of more efficient mixing.

As a method of adding the polyhydric alcohol and the acid aqueous solution having 2 to 6 carbon atoms to the cellulose ether to be depolymerized, a method comprising a step of adding the polyhydric alcohol and the acid aqueous solution having 2 to 6 carbon atoms to the cellulose ether to be depolymerized by spraying, showering, dropping or the like, while stirring the cellulose ether, is preferable. The other examples include a method comprising steps of: adding the polyhydric alcohol to the cellulose ether to be depolymerized, while stirring the cellulose ether, and then adding the acid aqueous solution thereto; a method comprising steps of: adding the acid aqueous solution to the cellulose ether to be depolymerized, while stirring the cellulose ether, and then adding the polyhydric alcohol having 2 to 6 carbon atoms thereto; and a method comprising a step of simultaneously adding the polyhydric alcohol and the acid aqueous solution to the cellulose ether to be depolymerized, while stirring the cellulose ether. Modification examples of the last method include a method comprising a step of simultaneously and separately adding an acid aqueous solution and a polyhydric alcohol to the cellulose ether to be depolymerized, while stirring the cellulose ether; and a method comprising a step of adding a mixture of the acid aqueous solution and the polyhydric alcohol to the cellulose ether to be depolymerized, while stirring the cellulose ether.

Of these methods, a method comprising the steps of: adding the polyhydric alcohol to the cellulose ether having a high degree of polymerization, while stirring the cellulose ether, and then adding the acid aqueous solution to the cellulose ether; and a method of simultaneously and separately adding the acid aqueous solution and the polyhydric alcohol to the cellulose ether having a high degree of polymerization, while stirring the cellulose ether, are preferable from the viewpoint of obtaining a cellulose ether having a low degree of polymerization and low yellowness.

A method of stirring the cellulose ether to be depolymerized is not particularly limited as long as the cellulose ether, the acid aqueous solution and the polyhydric alcohol having 2 to 6 carbon atoms are uniformly mixed. For example, the later-described reactor to be used for depolymerizing the cellulose ether may be used.

A rate at which the cellulose ether is stirred is preferably from 1 to 1000 rpm from the viewpoint of uniformly mixing the cellulose ether to be depolymerized, the acid aqueous solution and the polyhydric alcohol having 2 to 6 carbon atoms.

The temperature of the cellulose ether just before the addition of the polyhydric alcohol and/or the acid aqueous solution is not particularly limited. It is preferably from 5 to 60° C., more preferably from 15 to 30° C., from the viewpoint of suppressing aggregation of the cellulose ether to be depolymerized.

The temperature of the polyhydric alcohol is not particularly limited. It is preferably from 5 to 60° C., more preferably from 15 to 30° C., from the viewpoint of controlling the viscosity of the depolymerized cellulose ether.

The temperature of the acid aqueous solution is not particularly limited. It is preferably from 5 to 60° C., more preferably from 5 to 30° C., from the viewpoint of controlling a viscosity of the cellulose ether having a low degree of polymerization.

The addition time of the polyhydric alcohol is preferably from 3 to 20 minutes, more preferably from 3 to 10 minutes, from the viewpoint of obtaining a depolymerized cellulose ether having low yellowness.

The addition time of the aqueous acid solution is preferably 20 minutes or less from the viewpoint of obtaining a depolymerized cellulose ether having low yellowness.

The ratio of the mass of water in the depolymerization reaction of the depolymerization step to the total mass in the depolymerization reaction, i.e., the water content in the depolymerization reaction, is preferably from 0.5 to 5.0% by mass, more preferably from 1.0 to 2.0% by mass, from the viewpoint of efficiently depolymerizing the cellulose ether. Here, when the cellulose ether to be brought into contact with the acid aqueous solution, the polyhydric alcohol having 2 to 6 carbon atoms and the acid aqueous solution are solely present at the start of the depolymerization reaction, the water content in the depolymerization reaction of the depolymerization step means a ratio of the mass of water during the depolymerization reaction to the total mass of the cellulose ether, the polyhydric alcohol and the acid aqueous solution, and is represented by the following formula:

[{mass of water (g) contained in pre-depolymerization cellulose ether+mass of water (g) contained in acid aqueous solution}/{mass of pre-depolymerization cellulose ether (g)+mass of polyhydric alcohol (g)+mass of acid aqueous solution (g)}]×100.

When the cellulose ether to be brought into contact with the aqueous acid solution, the aqueous solution of polyhydric alcohol having 2 to 6 carbon atoms and the acid aqueous solution are solely present at the start of the depolymerization reaction, the water content means a ratio of the mass of water during the depolymerization reaction to the total mass of the cellulose ether, the aqueous solution of polyhydric alcohol having 2 to 6 carbon atoms and the acid aqueous solution, and is represented by the following formula:

[{mass of water (g) contained in pre-depolymerize cellulose ether+mass of water (g) contained in aqueous solution of polyhydric alcohol+mass of water (g) contained in acid aqueous solution}/ {mass of pre-depolymerization cellulose ether (g)+mass of aqueous solution of polyhydric alcohol (g)+mass of acid aqueous solution (g)}]×100.

The mass of water contained in cellulose ether may be determined in accordance with "Loss on Drying Test" in General Tests of the Japanese Pharmacopoeia Seventeenth Edition. When a component other than the cellulose ether and the polyhydric alcohol and the acid aqueous solution is present at the start of the depolymerization reaction, the water content in the depolymerization reaction of the depolymerization step may be calculated in consideration of the mass of water contained in the component and the total mass including the mass of the component.

The reaction temperature in the depolymerization step is preferably from 40 to 120° C., more preferably from 60 to 100° C., from the viewpoint of controlling the viscosity of the depolymerized cellulose ether.

The depolymerization time in the depolymerization step is not particularly limited as long as the depolymerized cellulose ether has a desired viscosity. It is preferably from 0.1 to 4.0 hours, more preferably from 0.1 to 2.0 hours, from the viewpoint of obtaining a cellulose ether having a low degree of polymerization and low yellowness.

Here, the depolymerization time in the depolymerization step means a period of time from the point at which the acid aqueous solution or a mixed solution of the acid aqueous solution and the polyhydric alcohol having 2 to 6 carbon atoms is started to be added to the cellulose ether having a high degree of polymerization to the point at which a degassing operation described later is started, or in the absence of degassing, to the point at which a cellulose ether having a low degree of polymerization obtained by the depolymerization is neutralized by addition of an alkali.

The depolymerization reaction is carried out in a dry state which is substantially in a powder state because the amount of the acid aqueous solution is small and the amount of the polyhydric alcohol having 2 to 6 carbon atoms is not large, although depending on the degree of depolymerization. The dry reaction or the reaction in a dry state means that a reaction of the pre-depolymerization cellulose ether, to which the polyhydric alcohol having 2 to 6 carbon atoms and the acid aqueous solution have been added, can be carried out in a dry state in which the pre-depolymerization cellulose ether can be sufficiently handled as a powder. In the depolymerization step, a ratio of the mass of the liquid component to the total mass in the depolymerization reaction, i.e., the liquid component content, is from 0.5 to 20.0% by mass, preferably from 1.0 to 10.0% by mass, and more preferably from 1.0 to 6.5% by mass, from the viewpoint of efficiently depolymerizing (reducing the viscosity of) the cellulose ether.

The liquid component content in the depolymerization reaction of the depolymerization reaction step is a ratio of the sum of the masses of the water and the polyhydric alcohol having 2 to 6 carbon atoms in the depolymerization reaction to a total mass of the cellulose ether to be brought into contact with the acid aqueous solution, the polyhydric alcohol, and the acid aqueous solution in which a non-liquid acid at the start temperature of the depolymerization is dissolved, provided that the depolymerization temperature is adjusted throughout the period from start to end of the depolymerization to allow the water and the polyhydric alcohol to remain in liquid states in the period and the acid to remain in a non-liquid state in the period. The liquid component content is represented by the following formula:

[{mass of water (g) contained in cellulose ether having a high degree of polymerization+mass of water (g) contained in acid aqueous solution+ mass of polyhydric alcohol having 2 to 6 carbon atoms (g)}/{mass of cellulose ether having a high degree of polymerization (g)+mass of polyhydric alcohol having 2 to 6 carbon atoms (g)+mass of acid aqueous solution (g)}]×100.

Here, when the polyhydric alcohol having 2 to 6 carbon atoms is not in a liquid state throughout the period, the mass of the polyhydric alcohol having 2 to 6 carbon atoms may be excluded from the numerator of the above formula. In addition, when the acid is in a liquid state throughout the period, the mass of water contained in the acid aqueous solution in the numerator of the above formula may be replaced with the mass of the acid aqueous solution. The atmospheric pressure is usually 1 atm at the start temperature of depolymerization.

In the depolymerization step, there is a possibility that the liquid component content in the total mass of the depolymerization reaction changes with time due to volatilization of the heated water. In this case, for example, the liquid component content can be determined by correcting the above formula using a method of measuring a water content at an arbitrary reaction time, or a method of calculating the mass of water in a gas phase based on a pressure of a reactor, a reaction temperature and a space volume of a reactor at an arbitrary reaction time. Regarding the volatilized acid, the acid concentration in the gas phase may be measured at an arbitrary reaction time by a known method or device such as a commercially available concentration measuring device, and may be used together with the above data for correcting the above formula.

The mass of water contained in the cellulose ether may be determined in accordance with "Loss on Drying Test" in General Tests of the Japanese Pharmacopoeia Seventeenth Edition. When a component other than the cellulose ether, the polyhydric alcohol and the acid aqueous solution is present at the start of the depolymerization reaction, the liquid component content in the depolymerization reaction of the depolymerization step may be calculated in consideration of the mass of the component in case that the component is a liquid, or the mass of water contained in the component in case that the component is a solid, as well as a total mass including the mass of the component.

The depolymerization step may be carried out, for example, in a reactor.

The reactor to be used for the depolymerization is not particularly limited. It is preferably a reactor capable of uniformly stirring cellulose ether particles in the reactor from the viewpoint of obtaining a cellulose ether having a low degree of polymerization and low yellowness, and examples thereof include a double cone type rotary reactor, an oblique cylinder type rotary reactor, an internal stirring reactor, and a fluidized bed reactor. In addition, the reactor to be used for the depolymerization is preferably jacketed from the viewpoint of controlling the reaction temperature during the depolymerization.

After completion of the depolymerization, there may be provided an optional step of degassing the inside of the reactor to remove the acid from the viewpoint of controlling the amounts of hydrochloric acid and water contained in the depolymerized cellulose ether. For example, when the acid aqueous solution is a hydrogen chloride aqueous solution, there may be provided an optional step of degassing the inside of the reactor to remove hydrogen chloride under reduced pressure after the depolymerization step. The inside pressure of the reactor during degassing is preferably from −60 to −98 kPaG, more preferably from −75 to −98 kPaG, from the viewpoint of efficiently removing the acid.

There may be provided an optional step of mixing the obtained depolymerized cellulose ether with an alkali to obtain a neutralized depolymerized cellulose ether. Examples of the alkali include a weak alkali such as sodium bicarbonate and sodium carbonate. An amount of the alkali to be added is not particularly limited as long as the acid is neutralized.

There may be provided an optional step or steps of pulverizing and sieving through the neutralized depolymerized cellulose ether with a sieve having a desired mesh size to obtain the depolymerized cellulose ether having a desired average particle size.

The viscosity reduction ratio by depolymerization in the depolymerization reaction is preferably from 40.0 to 99.9%, more preferably from 50.0 to 99.9%, and still more preferably from 60.0 to 99.9%. When the viscosity reduction ratio is less than 40.0%, a cellulose ether having a low degree of polymerization and low yellowness may not be obtained.

Here, the viscosity reduction ratio by depolymerization is a ratio of a difference in a viscosity (viscosity before depolymerization–viscosity after depolymerization) at 20° C. of a 2% by mass aqueous solution of a cellulose ether before and after the depolymerization to a viscosity (a viscosity before depolymerization) at 20° C. of a 2% by mass aqueous solution of a pre-depolymerization cellulose ether, and is defined by the following formula:

{(viscosity before depolymerize–viscosity after depolymerization)/viscosity before depolymerization}×100.

The viscosity at 20° C. of the 2% by mass aqueous solution of the cellulose ether after the depolymerization is preferably from 1.0 to 20.0 mPa·s, more preferably from 2.0 to 20.0 mPa·s, and still more preferably from 3.0 to 15.0 mPa·s, from the viewpoint of keeping the viscosity of the solution low during film coating.

EXAMPLES

Hereinafter, the invention will be described in detail with reference to Examples and Comparative Examples. It should not be construed that the invention is limited by or to Examples.

Measurement of yellowness was conducted by the method described below.

<Measurement of Yellowness>

A 2% by mass aqueous solution of a cellulose ether having a low degree of polymerization degree, the solution having a temperature of 20° C., was prepared, and subjected to the measurement of yellowness with an SM color computer SM-4 (produced by Suga Test Instruments Co., Ltd.).

Example 1

A mixed solution of 6.97 g of 14% by mass hydrochloric acid (0.0136 mol of hydrogen chloride relative to 1 mol of HPMC before depolymerization) of 20° C. and 5.75 g of glycerine (0.0318 mol of glycerine relative to 1 mol of HPMC before depolymerization) of 20° C. was added to 400 g of HPMC (HPMC before depolymerization, a methoxy group content of 29.0% by mass and a hydroxypropoxy group content of 9.2% by mass) of 20° C. in a 2 L eggplant flask over 5 minutes.

After the addition, a depolymerization reaction was carried out for 60 minutes, while the flask was rotated and heated in a water bath of 84° C. Then, 1.8 g of sodium bicarbonate was added to the flask for neutralization to obtain 400 g of depolymerized HPMC. The properties of HPMC before depolymerization, the depolymerization conditions, and the properties of the obtained HPMC after depolymerization are shown in Table 1

Example 2

A depolymerization reaction and neutralization were carried out in the same manner as in Example 1 to obtain 400 g of depolymerized HPMC except that an amount of the glycerin was changed to 11.5 g (0.0636 mol of glycerin relative to 1 mol of HPMC before depolymerization). The properties of HPMC before depolymerization, the depolymerization conditions, and the properties of the depolymerized HPMC are shown in Table 1.

Example 3

A depolymerization reaction and neutralization were carried out in the same manner as in Example 1 to obtain 400 g of depolymerized HPMC except that an amount of the glycerin was changed to 17.3 g (0.0954 mol of glycerine relative to 1 mol of HPMC before depolymerization). The properties of the HPMC before depolymerization, the depolymerization conditions, and the properties of the depolymerized HPMC are shown in Table 1.

Example 4

Hydrochloric acid and glycerin were added to the HPMC before depolymerization in the same manner as in Example 1 except that an amount of the glycerin was changed to 17.3 g (0.0954 mol of glycerin relative to 1 mol of HPMC before depolymerization).

After the addition, the reaction was carried out for 60 minutes, while the flask was rotated and heated in a water bath of 84° C. Then, the inside of the flask was degassed at an inside pressure of −93 kPaG for 60 minutes, while the flask was held in a water bath of 84° C., to remove hydrochloric acid. Thereafter, 1.8 g of sodium bicarbonate was added to the flask for neutralization to obtain 400 g of depolymerized HPMC. The properties of the HPMC before polymerization, the depolymerization conditions, and the properties of the depolymerized HPMC are shown in Table 1.

Example 5

In a 2 L eggplant flask, 400 g of the same pre-depolymerization HPMC of 20° C. as the pre-depolymerization HPMC used in Example 1 was subjected to addition of 17.3 g of glycerin of 20° C. (0.0956 mol of glycerin relative to 1 mole of HPMC before depolymerization) over a period of 2.5 minutes and then addition of 6.97 g of 14% by mass hydrochloric acid of 20° C. (0.0136 mol of hydrogen chloride relative to 1 mol of HPMC before depolymerization) over a period of 2.5 minutes.

After the addition, a depolymerization reaction and neutralization were carried out in the same manner as in Example 1 to obtain 400 g of depolymerized HPMC. The properties of the HPMC before depolymerization, the depolymerization conditions, and the properties of the depolymerized HPMC are shown in Table 1.

Example 6

A depolymerization reaction and neutralization were carried out in the same manner as in Example 1 except that the glycerin was changed to 11.6 g of ethylene glycol (0.0955 mol of ethylene glycol relative to 1 mol of HPMC before depolymerization) to obtain 400 g of depolymerized HPMC. The properties of HPMC before depolymerization, the depolymerization conditions, and the properties of the depolymerized HPMC are shown in Table 1.

Example 7

A depolymerization reaction and neutralization were carried out in the same manner as in Example 1 except that the glycerin was changed to 14.3 g of propylene glycol (0.0955 mol of propylene glycol relative to 1 mol of HPMC before depolymerization) to obtain 400 g of depolymerized HPMC. The properties of HPMC before depolymerization, the depolymerization conditions, and the properties of the depolymerized HPMC are shown in Table 1.

Example 8

A depolymerization reaction and neutralization were carried out in the same manner as in Example 1 except that the glycerin was changed to 16.9 g of 1,3-butylene glycol (0.0954 mol of 1,3-butylene glycol relative to 1 mol of HPMC before depolymerization) to obtain 400 g of depolymerized HPMC. The properties of HPMC before depolymerization, the depolymerization conditions, and the properties of the depolymerized HPMC are shown in Table 1.

Example 9

A depolymerization reaction and neutralization were carried out in the same manner as in Example 1 except that the glycerin was changed to 28.1 g of triethylene glycol (0.0956 mol of triethylene glycol relative to 1 mol HPMC before depolymerization) to obtain 400 g of depolymerized HPMC. The properties of HPMC before depolymerization, the depolymerization conditions, and the properties of the depolymerized HPMC are shown in Table 1.

Example 10

A mixed solution of 6.97 g of 14% by mass hydrochloric acid of 20° C. (0.0125 mol of hydrogen chloride relative to 1 mol of MC having a high degree of polymerization) and 17.3 g of glycerin of 20° C. (0.0879 mol of glycerin relative to 1 mol MC having a high degree of polymerization) was added to 400 g of MC (a methoxy group content of 29.5% by mass) of 20° C. in a 2 L eggplant flask over 5 minutes.

After the addition, a depolymerization reaction and neutralization were carried out in the same manner as in Example 1 to obtain 400 g of depolymerized MC. The properties of MC before depolymerization, the depolymerization conditions, and the properties of the depolymerized MC are shown in Table 1.

Comparative Example 1

The 6.97 g of 14% by mass hydrochloric acid of 20° C. (0.0136 mol of hydrogen chloride relative to 1 mol of HPMC before depolymerization) was added to 400 g of pre-depolymerization HPMC of 20° C. in a 2 L eggplant flask over a period of 5 minutes.

After the addition, a depolymerization reaction and neutralization were carried out in the same manner as in Example 1 to obtain 400 g of the depolymerized HPMC. The properties of HPMC before depolymerization, the depolymerization conditions, and the properties of the depolymerized HPMC are shown in Table 1.

Comparative Example 2

A depolymerization reaction and neutralization were carried out in the same manner as in Example 1 except that the glycerin was changed to 6.00 g of methanol (0.0956 mol of methanol relative to 1 mole of HPMC before depolymerization) to obtain 400 g of the depolymerized HPMC. The properties of HPMC before depolymerization, the depolymerization conditions, and the properties of the depolymerized HPMC having a low degree of polymerization are shown in Table 1.

Comparative Example 3

A depolymerization reaction and neutralization were carried out in the same manner as in Example 1 except that the glycerin was changed to 36.4 g of tetraethylene glycol (0.0956 mol of tetraethylene glycol relative to 1 mol of HPMC before depolymerization) to obtain 400 g of the depolymerized HPMC. The properties of HPMC before depolymerization, the depolymerization conditions, and the properties of the depolymerized HPMC are shown in Table 1.

Comparative Example 4

The 6.97 g of 14% by mass hydrochloric acid of 20° C. (0.0125 mol of hydrogen chloride relative to 1 mol of MC before depolymerization) was added to 400 g of pre-depolymerization MC of 20° C. in a 2 L eggplant flask over a period of 5 minutes.

After the addition, a depolymerization reaction and neutralization were carried out in the same manner as in Example 1 to obtain 400 g of depolymerized MC. The properties of MC before depolymerization, the depolymerization conditions, and the properties of the depolymerized MC are shown in Table 1.

TABLE 1

| | cellulose ether before depolymerization | | | | | depolymerization conditions | | | cellulose ether after depolymerization | |
|---|---|---|---|---|---|---|---|---|---|---|
| | | viscosity (mPa·s) | water content (mass %) | polyhydric alcohol type | amount*1 (mol) | water content (mass %) | liquid component content (mass %) | viscosity reduction ratio (%) | viscosity (mPa·s) | yellowness |
| | type | | | | | | | | | |
| Example1 | HPMC | 1190 | 0.44 | glycerin | 0.0318 | 1.88 | 3.27 | 99.5 | 5.82 | 3.9 |
| Example2 | HPMC | 1190 | 0.31 | glycerin | 0.0636 | 1.73 | 4.48 | 99.5 | 5.48 | 3.2 |
| Example3 | HPMC | 1190 | 0.33 | glycerin | 0.0954 | 1.72 | 5.79 | 99.6 | 4.28 | 3.1 |
| Example4 | HPMC | 1190 | 0.33 | glycerin | 0.0954 | 1.72 | 5.79 | 99.7 | 3.32 | 3.8 |
| Example5 | HPMC | 1190 | 0.56 | glycerin | 0.0956 | 1.94 | 6.01 | 99.5 | 5.84 | 3.1 |
| Example6 | HPMC | 1190 | 0.35 | ethylene glycol | 0.0955 | 1.77 | 4.55 | 99.6 | 4.94 | 3.4 |

TABLE 1-continued

| | cellulose ether before depolymerization | | | polyhydric alcohol | | depolymerization conditions | | viscosity re-duction ratio (%) | cellulose ether after depolymerization | |
|---|---|---|---|---|---|---|---|---|---|---|
| | type | viscosity (mPa·s) | water content (mass %) | type | amount*1 (mol) | liquid water content (mass %) | com-ponent content (mass %) | | viscosity (mPa·s) | yellow-ness |
| Example 7 | HPMC | 1190 | 0.40 | propylene glycol | 0.0955 | 1.80 | 5.19 | 99.5 | 5.75 | 2.9 |
| Example 8 | HPMC | 1190 | 0.30 | 1,3-butylene glycol | 0.0954 | 1.70 | 5.68 | 99.4 | 6.71 | 3.3 |
| Example 9 | HPMC | 1190 | 0.46 | triethylene glycol | 0.0956 | 1.80 | 8.27 | 99.6 | 5.32 | 3.7 |
| Example 10 | MC | 466 | 0.54 | glycerin | 0.0879 | 1.92 | 5.99 | 98.6 | 6.38 | 7.4 |
| Comp. Ex. 1 | HPMC | 1190 | 0.44 | — | — | 1.91 | 1.91 | 99.4 | 6.84 | 5.2 |
| Comp. Ex. 2 | HPMC | 1190 | 0.53 | methanol | 0.0957 | 1.96 | 3.42 | 99.5 | 6.16 | 4.8 |
| Comp. Ex. 3 | HPMC | 1190 | 0.79 | tetraethylene glycol | 0.0959 | 2.06 | 10.27 | 99.5 | 6.27 | 4.6 |
| Comp. Ex. 4 | MC | 466 | 0.44 | — | — | 1.91 | 1.91 | 98.1 | 8.66 | 10.7 |

*1"amount" means an added amount of polyhydric alcohol relative to 1 mol of cellulose ether before depolymerization.

It is evident from the results of Example 1 and Comparative Example 1 and the results of Example 9 and Comparative Example 3 that yellowness of the depolymerized cellulose ether can be improved by bringing a cellulose ether into contact with an aqueous solution of an acid in the presence of a polyhydric alcohol for depolymerization.

It is evident from the results of Examples 1 to 3 that as the added amount of the polyhydric alcohol increases, the effect of improving the yellowness increases.

It is evident from the results of Example 3 and Comparative Example 2 that when the monohydric alcohol is used, the effect of improving the yellowness is insufficient.

It is evident from the results of Example 9 and Comparative Example 3 that the polyhydric alcohol having the carbon atoms of more than 6 makes the improvement of yellowness to be small.

The invention claimed is:

1. A method for producing a depolymerized cellulose ether, the method comprising a depolymerization step of depolymerizing a cellulose ether with an aqueous solution of acid in the presence of a polyhydric alcohol having 2 to 6 carbon atoms, wherein a ratio of the mass of liquid in a depolymerization reaction of the depolymerization step to the total mass in the depolymerization reaction is from 0.5 to 20.0% by mass.

2. The method for producing a depolymerized cellulose ether according to claim 1, wherein the mass of the liquid in the depolymerization reaction of the depolymerization step is the total mass of the polyhydric alcohol, water contained in the cellulose ether to be depolymerized, and water contained in the aqueous solution of acid.

3. The method for producing a depolymerized cellulose ether according to claim 2, wherein the depolymerization step comprises adding the polyhydric alcohol and the aqueous solution of acid in this order, in reverse order, simultaneously or as a mixture thereof to the cellulose ether to be depolymerized.

4. The method for producing a depolymerized cellulose ether according to claim 3, wherein the polyhydric alcohol is selected from the group consisting of an alkylene-containing polyhydric alcohol and an oxyalkylene-containing polyhydric alcohol.

5. The method for producing a depolymerized cellulose ether according to claim 3, wherein the cellulose ether is selected from the group consisting of an alkyl cellulose, a hydroxyalkyl cellulose and a hydroxyalkyl alkyl cellulose.

6. The method for producing a depolymerized cellulose ether according to claim 2, wherein the polyhydric alcohol is selected from the group consisting of an alkylene-containing polyhydric alcohol and an oxyalkylene-containing polyhydric alcohol.

7. The method for producing a depolymerized cellulose ether according to claim 2, wherein the cellulose ether is selected from the group consisting of an alkyl cellulose, a hydroxyalkyl cellulose and a hydroxyalkyl alkyl cellulose.

8. The method for producing a depolymerized cellulose ether according to claim 1, wherein the depolymerization step comprises adding the polyhydric alcohol and the aqueous solution of acid in this order, in reverse order, simultaneously or as a mixture thereof to the cellulose ether to be depolymerized.

9. The method for producing a depolymerized cellulose ether according to claim 8, wherein the polyhydric alcohol is selected from the group consisting of an alkylene-containing polyhydric alcohol and an oxyalkylene-containing polyhydric alcohol.

10. The method for producing a depolymerized cellulose ether according to claim 8, wherein the cellulose ether is selected from the group consisting of an alkyl cellulose, a hydroxyalkyl cellulose and a hydroxyalkyl alkyl cellulose.

11. The method for producing a depolymerized cellulose ether according to claim 1, wherein the polyhydric alcohol is selected from the group consisting of an alkylene-containing polyhydric alcohol and an oxyalkylene-containing polyhydric alcohol.

12. The method for producing a depolymerized cellulose ether according to claim 11, wherein the cellulose ether is selected from the group consisting of an alkyl cellulose, a hydroxyalkyl cellulose and a hydroxyalkyl alkyl cellulose.

13. The method for producing a depolymerized cellulose ether according to claim 1, wherein the cellulose ether is selected from the group consisting of an alkyl cellulose, a hydroxyalkyl cellulose and a hydroxyalkyl alkyl cellulose.

* * * * *